(12) United States Patent
Honglin et al.

(10) Patent No.: US 8,780,422 B2
(45) Date of Patent: Jul. 15, 2014

(54) SHARED MOTOR DRIVER FOR INKJET PRINTERS

(71) Applicants: Pan Honglin, Singapore (SG); Vincent Gerard D'Silva, Singapore (SG)

(72) Inventors: Pan Honglin, Singapore (SG); Vincent Gerard D'Silva, Singapore (SG)

(73) Assignee: Eastman Kodak Company, Rochester, NY (US)

( * ) Notice: Subject to any disclaimer, the term of this patent is extended or adjusted under 35 U.S.C. 154(b) by 116 days.

(21) Appl. No.: 13/625,269

(22) Filed: Sep. 24, 2012

(65) Prior Publication Data

US 2014/0085690 A1   Mar. 27, 2014

(51) Int. Cl.
*H04N 1/04* (2006.01)
*H04N 1/00* (2006.01)

(52) U.S. Cl.
USPC ............................... 358/498; 358/401

(58) Field of Classification Search
USPC .................... 358/498, 474, 505, 401, 403
See application file for complete search history.

(56) References Cited

U.S. PATENT DOCUMENTS 7,948,663 B2    5/2011   Doan et al.
2010/0166288 A1*  7/2010  Spall et al. .................... 382/137

* cited by examiner

*Primary Examiner* — Douglas Tran
(74) *Attorney, Agent, or Firm* — Peyton C. Watkins (57) ABSTRACT

A scanning apparatus includes a transparent platen; a scan assembly; a first motor for moving the scan assembly across the transparent platen; an automatic document feeder; a second motor for feeding documents through the automatic document feeder; a first bi-directional switch element for driving the first motor; a second bi-directional switch element for driving the second motor; and a motor driver for selectively controlling the first bi-directional switch element or the second bi-directional switch element.

22 Claims, 9 Drawing Sheets

SHARED MOTOR DRIVER FOR INKJET PRINTERS

FIELD OF THE INVENTION

The present invention relates generally to a scanning apparatus with an automatic document feeder, and more particularly to a motor driver for the scanning apparatus.

BACKGROUND OF THE INVENTION

Optical scanners operate by imaging an object (e.g. a document) with a light source, and sensing a resultant light signal with an optical sensor array (also called a photosensor array herein). Each optical sensor or photoreceptor in the array generates a data signal representative of the intensity of light impinged thereon for a corresponding portion of the imaged object. The data signals from the array sensors are then processed (typically digitized) and stored in a temporary memory such as a semiconductor memory or on a hard disk of a computer, for example, for subsequent manipulation and printing or display, such as on a computer monitor. The image of the scanned object is projected onto the photosensor array incrementally by use of a moving scan line. The moving scan line is produced either by moving the document with respect to a scan assembly, or by moving the scan assembly relative to the document. Either or both of these methods may be embodied in a flat bed scanner, multi-function printer, or any scanner having manual and automatic feed capabilities.

One type of scanner is the contact image sensor (CIS) scanner. A CIS scanner includes a contact image sensor having a length that is substantially equal to the width of the scanning region. The photosensors in a CIS are substantially the same size as the pixel resolution of the scanner. Because the photosensors in the CIS relatively large, a low power light source (such as one or more LED's) is sufficient to provide enough illumination in the scan line image region. The CIS has a short depth of field and is typically mounted beneath the transparent platen upon which the document is placed. One or more rollers in the CIS carriage are biased against the bottom of the transparent platen so that the CIS is always at substantially the same distance from the top of the transparent platen.

Photosensors in a CIS scanner photosensor array are aligned in a direction parallel to the longitudinal axis of the scan line image which is projected thereon. The direction perpendicular to the photosensor array direction is referred to herein as the "scan" direction (i.e., the direction of movement of a document or of the photosensor array for scanning of the image).

At any instant when an object is being scanned, each photosensor in the photosensor array has a corresponding area on the object which is being imaged thereon. This corresponding area on the scanned object is referred to herein as a pixel. An area on a scanned object corresponding to the entire extent of the photosensor array is referred to herein as a scan line. For descriptive purposes, a scanned object is considered to have a series of fixed adjacently positioned scan lines. Further, scanners are typically operated at a scan line sweep rate such that one scan line width is traversed during each sampling interval.

When working with cut sheet print media, a copying, scanning or multifunction printing apparatus can provide automatic document feed, as well as manual document placement capabilities. An automatic document feeder (ADF) mechanism is capable of automatically loading and unloading single sheets sequentially to a functional station where the apparatus performs an operation, e.g., sequentially scanning the fed document sheets for copying, faxing, displaying on a computer monitor, or the like. Following the operation, the ADF then off-loads a sheet and feeds the immediately following sheet of the document to the functional station. A sequential flow of sheets by the ADF and positioning without the necessity of manual handling reduces the time required to accomplish the complete functional operation. An ADF can be designed to scan single-sided originals or two-sided originals.

Each document fed into the ADF is conveyed to an automatic scanning region where the document is scanned by a photosensor array and then the document is conveyed to a point outside the ADF, such as a document output tray. During ADF operation, the photosensor array remains fixed at the automatic scanning region "reading" or scanning the image as the document is conveyed past the scanning point by the ADF. During manual scanning, the document lays flat on and covers a portion of the flat platen while the photosensor array is moved under the platen the length (or width) of the document to read or scan the document. Conventional scanners having an ADF use a first motor to move the document during ADF operation and a second motor to move the photosensor array during manual scanning U.S. Pat. No. 7,948,663 discloses a scanning apparatus having a single motor that is shared between moving the document during ADF operation and moving the photosensor array during manual scanning. This is possible because the two types of motion do not occur at the same time. During ADF operation the document is moved, and during manual scanning the photosensor array is moved. This solution saves the cost of a motor. However, selectively transmitting power from the single motor to the ADF or to the photosensor array requires some complexity in the gearing.

A need exists for a scanning apparatus with ADF capability, either as a standalone scanner or incorporated as part of a multifunction printer, having cost advantages relative to the conventional scanner having an ADF, but without the power transmission complexities associated with sharing a single motor between the ADF and the photosensor array.

SUMMARY OF THE INVENTION

The present invention is directed to overcoming one or more of the problems set forth above. Briefly summarized, according to one aspect of the invention, the invention resides in a scanning apparatus comprising a transparent platen; a scan assembly; a first motor for moving the scan assembly across the transparent platen; an automatic document feeder; a second motor for feeding documents through the automatic document feeder; a first bi-directional switch element for driving the first motor; a second bi-directional switch element for driving the second motor; and a motor driver for selectively controlling the first bi-directional switch element or the second bi-directional switch element.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein.

DETAILED DESCRIPTION OF THE INVENTION

Figure 1:
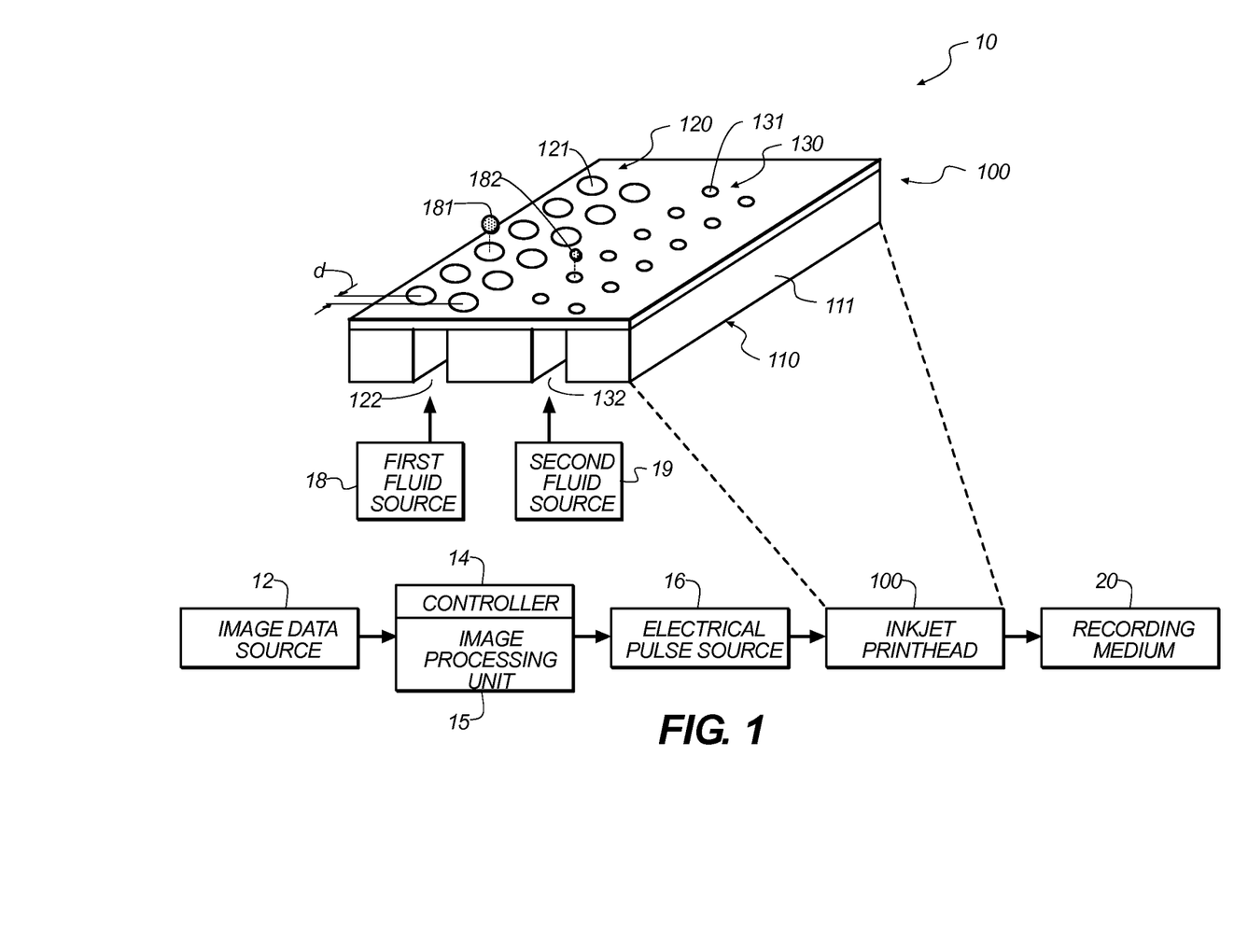
FIG. 1 is a schematic representation of an inkjet printer system.

Referring to FIG. 1, a schematic representation of an inkjet printer system 10 is shown, for its usefulness as a printing apparatus in a multifunction printer having an associated scanning apparatus as in the present invention. The inkjet printer system 10 includes an image data source 12, which provides data signals that are interpreted by a controller 14 as being commands to eject drops. At least a portion of the controller 14 can be integrated as a system on chip (SOC) integrated circuit. The controller 14 includes an image processing unit 15 for rendering images for printing, and outputs signals to an electrical pulse source 16 of electrical energy pulses that are inputted to an inkjet printhead 100, which includes at least one inkjet printhead die 110. The printhead die 100 can include driver circuitry and logic circuitry, and an ejector voltage can be provided to the drop ejectors on the inkjet printhead 100, such that upon appropriate clock pulses, data pulses, and fire enable pulses from the controller 14, electrical pulses are provided to the drop ejectors. In such cases, the electrical pulse source 16 includes the ejector voltage supply, as well as electronics integrated into the printhead die 110.

In the example shown in FIG. 1, there are two nozzle arrays 120 and 130. Nozzles 121 in the first nozzle array 120 have a larger opening area than nozzles 131 in the second nozzle array 130. In this example, each of the two nozzle arrays 120 and 130 has two staggered rows of nozzles 121 and 131, each row having a nozzle density of 600 per inch. The effective nozzle density then in each array is 1200 per inch (i.e. $d=\frac{1}{1200}$ inch in FIG. 1). If pixels on a recording medium 20 were sequentially numbered along the paper advance direction, the nozzles 121 or 131 from one row of an array 120 or 130 would print the odd numbered pixels, while the nozzles 121 or 131 from the other row of the array 120 or 130 would print the even numbered pixels.

In fluid communication with each nozzle array 120 and 130 is a corresponding ink delivery pathway 122 or 132. The ink delivery pathway 122 is in fluid communication with the first nozzle array 120, and the ink delivery pathway 132 is in fluid communication with the second nozzle array 130. Portions of the ink delivery pathways 122 and 132 are shown in FIG. 1 as openings through a printhead die substrate 111. One or more inkjet printhead die 110 will be included in the inkjet printhead 100, but for greater clarity only one inkjet printhead die 110 is shown in FIG. 1. In FIG. 1, a first fluid source 18 supplies ink to the first nozzle array 120 via ink delivery pathway 122, and a second fluid source 19 supplies ink to the second nozzle array 130 via the ink delivery pathway 132. Although distinct fluid sources 18 and 19 are shown, in some applications, it can be beneficial to have a single fluid source supplying ink to both the first nozzle array 120 and the second nozzle array 130 via ink delivery pathways 122 and 132 respectively. Also, in some embodiments, fewer than two or more than two nozzle arrays 120 and 130 can be included on the printhead die 110. In some embodiments, all nozzles 121 and 131 on the inkjet printhead die 110 can be the same size, rather than having multiple sized nozzles on the inkjet printhead die 110.

The drop forming mechanisms associated with the nozzles 121, 131 are not shown in FIG. 1. The drop forming mechanisms can be of a variety of types, some of which include a resistive heating element to vaporize a portion of ink and thereby cause ejection of a droplet, or a piezoelectric transducer to constrict the volume of a fluid chamber and thereby cause ejection, or an actuator which is made to move (for example, by heating a bi-layer element) and thereby cause ejection. In any case, electrical pulses from the electrical pulse source 16 are sent to the various drop ejectors according to the desired deposition pattern. In the example of FIG. 1, droplets 181 ejected from the first nozzle array 120 are larger than droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on the recording medium 20.

Figure 2:
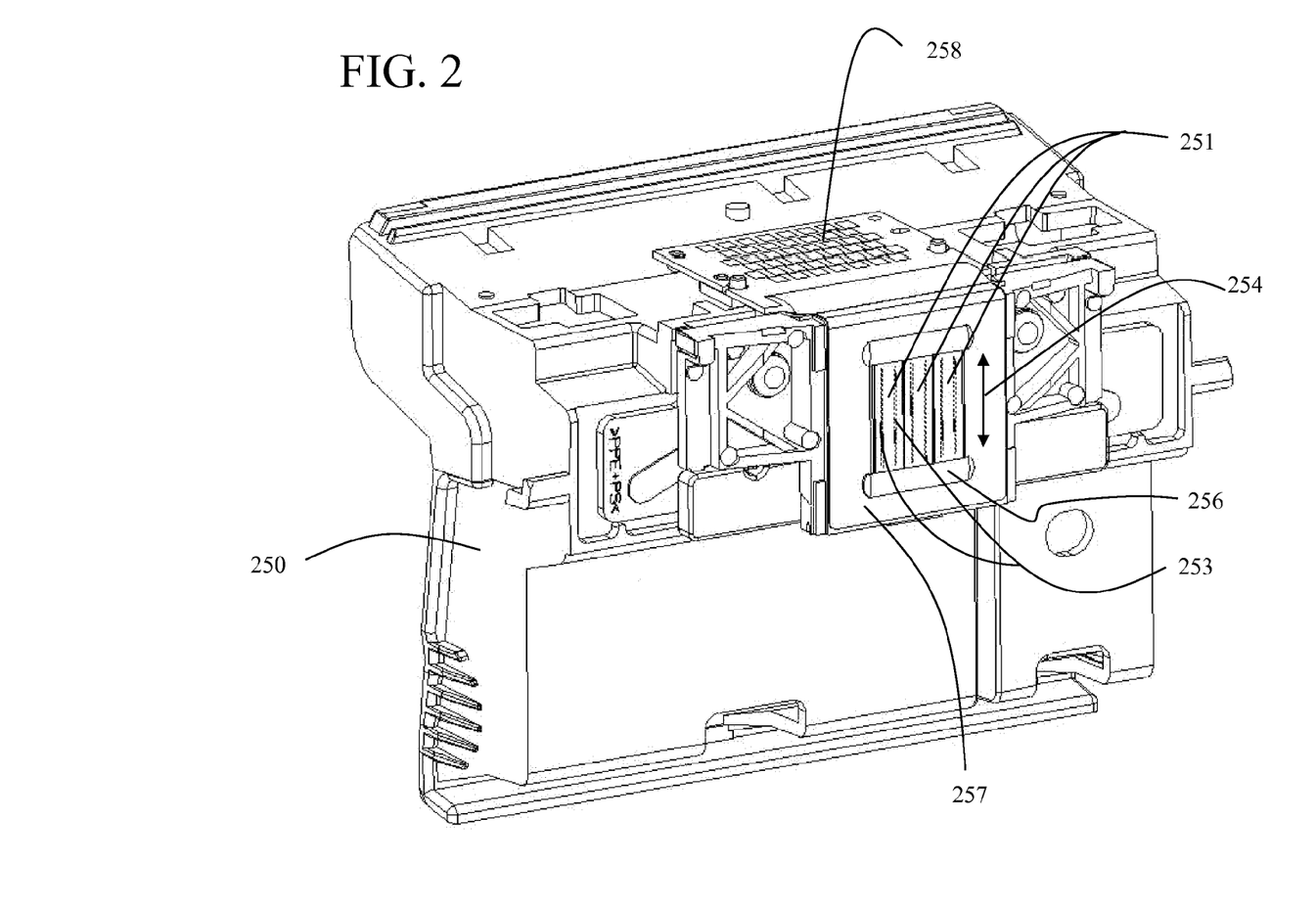
FIG. 2 is a perspective of a portion of a printhead.

FIG. 2 shows a perspective view of a portion of a printhead 250, which is an example of the inkjet printhead 100. The printhead 250 includes three printhead die 251 (similar to the printhead die 110 in FIG. 1), each printhead die 251 containing two nozzle arrays 253, so that the printhead 250 contains six nozzle arrays 253 altogether. The six nozzle arrays 253 in this example can each be connected to separate ink sources (not shown in FIG. 2); such as cyan, magenta, yellow, text black, photo black, and a colorless protective printing fluid. Each of the six nozzle arrays 253 is disposed along nozzle array direction 254, and the length of each nozzle array 120, 130 along the nozzle array direction 254 is typically on the order of 1 inch or less. Typical lengths of recording media are 6 inches for photographic prints (4 inches by 6 inches) or 11 inches for paper (8.5 by 11 inches). Thus, in order to print a full image, a number of swaths are successively printed while moving the printhead 250 across the recording medium 20. Following the printing of a swath, the recording medium 20 is advanced along a media advance direction 304 that is substantially parallel to the nozzle array direction 254.

Also shown in FIG. 2 is the flex circuit 257 to which the printhead die 251 are electrically interconnected, for example, by wire bonding or TAB bonding. The interconnections are covered by an encapsulant 256 for protection. The flex circuit 257 bends around the side of the printhead 250 and connects to a connector board 258. When the printhead 250 is mounted into a carriage 200 (see FIG. 3), the connector board 258 is electrically connected to a connector (not shown) on the carriage 200, so that electrical signals can be transmitted to the printhead die 251.

Figure 3:
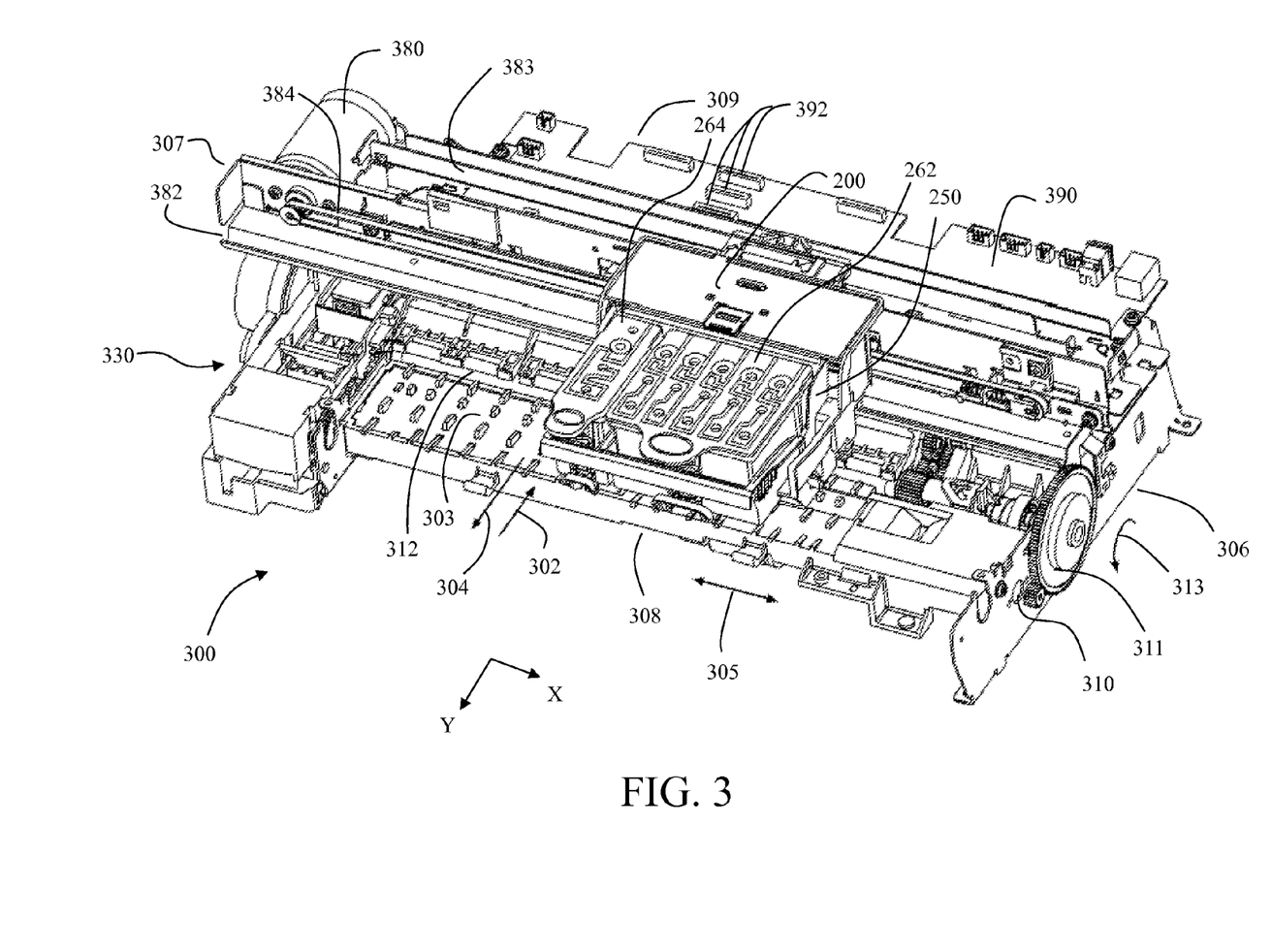
FIG. 3 is a perspective of a portion of a carriage printer.

FIG. 3 shows a portion of a desktop carriage printer. Some of the parts of the printer have been hidden in the view shown in FIG. 3 so that other parts can be more clearly seen. A printer chassis 300 has a print region 303 across which the carriage 200 is moved back and forth in a carriage scan direction 305 along the X axis, between a right side 306 and a left side 307 of the printer chassis 300, while drops are ejected from the printhead die 251 (not shown in FIG. 3) on the printhead 250 that is mounted on the carriage 200. A carriage motor 380 rotates in forward and reverse directions to move a belt 384 to move the carriage 200 back and forth along a carriage guide rail 382. An encoder sensor (not shown) is mounted on the carriage 200 and indicates carriage location relative to an encoder fence 383.

The printhead 250 is mounted in the carriage 200, and a multi-chamber ink supply 262 and single-chamber ink supply 264 are mounted in the printhead 250. The mounting orientation of the printhead 250 is rotated relative to the view in FIG. 2 so that the printhead die 251 are located at the bottom side of the printhead 250; the droplets of ink are ejected downward onto the recording medium in print region 303 in the view of FIG. 3. The multi-chamber ink supply 262, in this example, contains five ink sources: cyan, magenta, yellow, photo-black, and colorless protective fluid; while the single-chamber ink supply 264 contains the ink source for text black. Paper or other recording medium, such as recording medium 20, (sometimes generically referred to as paper or media herein) is loaded along a paper load entry direction 302 toward the front of the printer chassis 308.

Figure 4:
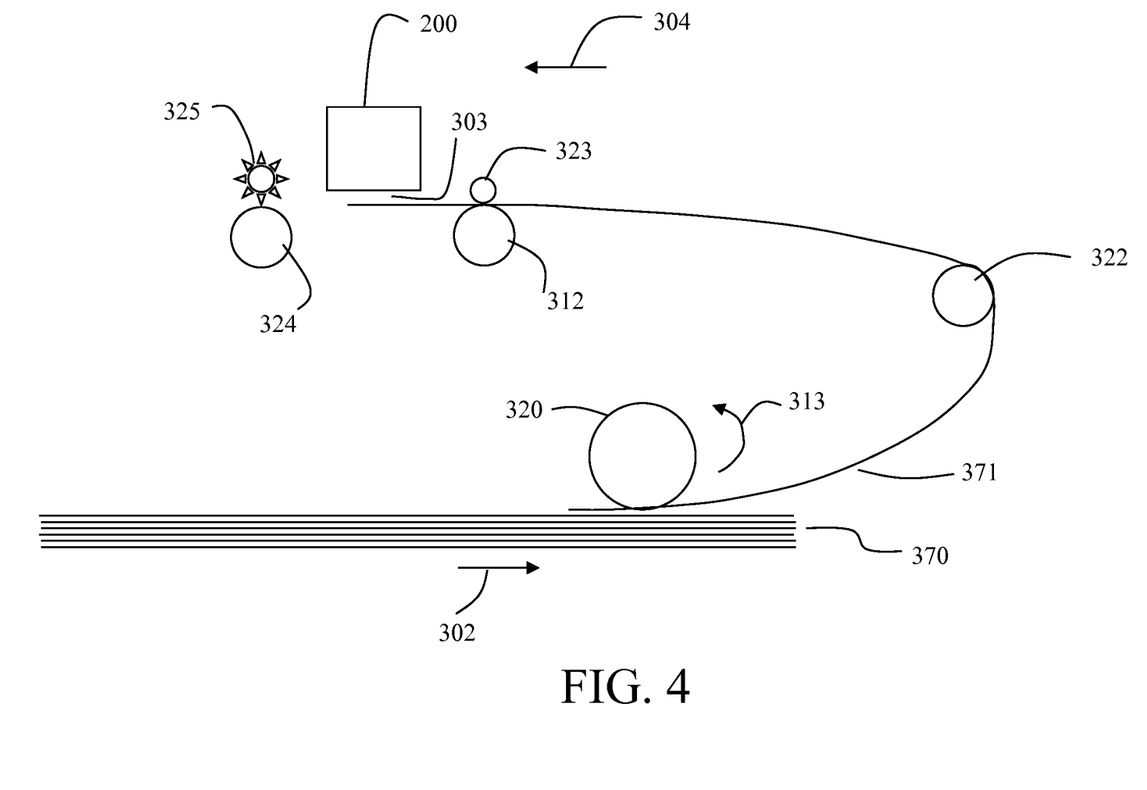
FIG. 4 is a schematic side view of an exemplary paper path in a carriage printer.

A variety of rollers are used to advance the print medium 20 through the printer as shown schematically in the side view of FIG. 4. In this example, a pick-up roller 320 moves a top piece or sheet 371 of a stack 370 of paper or other recording medium 20 in the direction of the arrow, a paper load entry direction 302. A turn roller 322 acts to move the paper around a C-shaped path (in cooperation with a curved rear wall surface) so that the paper continues to advance along the media advance direction 304 from a rear 309 of the printer chassis 300 (with reference also to FIG. 3). The paper is then moved by feed roller 312 and idler roller(s) 323 to advance along the Y axis across the print region 303, and from there to a discharge roller 324 and star wheel(s) 325 so that printed paper exits along the media advance direction 304. The feed roller 312 includes a feed roller shaft along its axis, and feed roller gear 311 (see FIG. 3) is mounted on the feed roller shaft. The feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller.

Referring to FIG. 3, the motor that powers the paper advance rollers is not shown, but a hole 310 at the right side 306 of the printer chassis 300 is where the motor gear (not shown) protrudes through in order to engage feed roller gear 311, as well as the gear for the discharge roller (not shown). Referring to FIG. 4, for normal paper pick-up and feeding, it is desired that all rollers rotate in a forward rotation direction 313. For deskewing the recording medium 20, in some modes the feed roller 312 and the discharge roller 324 are rotated in reverse while the turn roller 322 is rotated forward.

Referring to FIG. 3, toward the left side 307 of the printer chassis 300, in the example of FIG. 3, is a maintenance station 330. Toward the rear 309 of the printer chassis 300, in this example, is located an electronics board 390, which includes cable connectors 392 for communicating via cables (not shown) to the printhead carriage 200 and from there to the printhead 250. Also on the electronics board 390 are typically mounted motor controllers for the carriage motor 380, for the paper advance motor, for the ADF and for the scanner. A processor and/or other control electronics (shown schematically as the controller 14 and the image processing unit 15 in FIG. 1) for controlling the printing process, a power management IC, and an optional connector for a cable to a host computer are also included on the electronics board 390. Optionally the motor controllers can be integrated onto the power management IC.

Many printing systems include scanning, copying and optionally faxing capabilities as well as printing capabilities. Such multifunction printers include an optical scanning apparatus as well as a printing apparatus. Optical scanners operate by imaging an object (e.g. a document) with a light source, and sensing a resultant light signal with an optical sensor array (also called a photosensor array herein). Each optical sensor or photoreceptor in the array generates a data signal representative of the intensity of light impinged thereon for a corresponding portion of the imaged object. The data signals from the array sensors are then processed (typically digitized) and stored in a temporary memory such as a semiconductor memory or on a hard disk of a computer, for example, for subsequent manipulation and printing or display, such as on a computer monitor. The image of the scanned object is projected onto the photosensor array incrementally by use of a moving scan line. The moving scan line is produced either by moving the document with respect to a scan assembly, or by moving the scan assembly relative to the document.

When working with cut sheet print media, a scanning apparatus can provide automatic document feed, as well as manual document placement capabilities. An automatic document feeder (ADF) mechanism is capable of automatically loading and unloading single sheets sequentially to a functional station where the apparatus performs an operation, e.g., sequentially scanning the fed document sheets for copying, faxing, displaying on a computer monitor, or the like. Following the operation, the ADF then off-loads a sheet and feeds the immediately following sheet of the document to the functional station. A sequential flow of sheets by the ADF and positioning without the necessity of manual handling reduces the time required to accomplish the complete functional operation.

Each document fed into the ADF is conveyed to an automatic scanning region where the document is scanned by a photosensor array and then the document is conveyed to a point outside the ADF, such as a document output tray. During ADF operation, the photosensor array remains fixed at the automatic scanning region "reading" or scanning the image as the document is conveyed past the scanning point by the ADF. During manual scanning, the document lays flat on and covers a portion of the flat platen while the photosensor array is moved under the platen the length (or width) of the document to read or scan the document. It is never required to move a document through the ADF and move the photosensor array for manual scanning at the same time.

Figure 5:
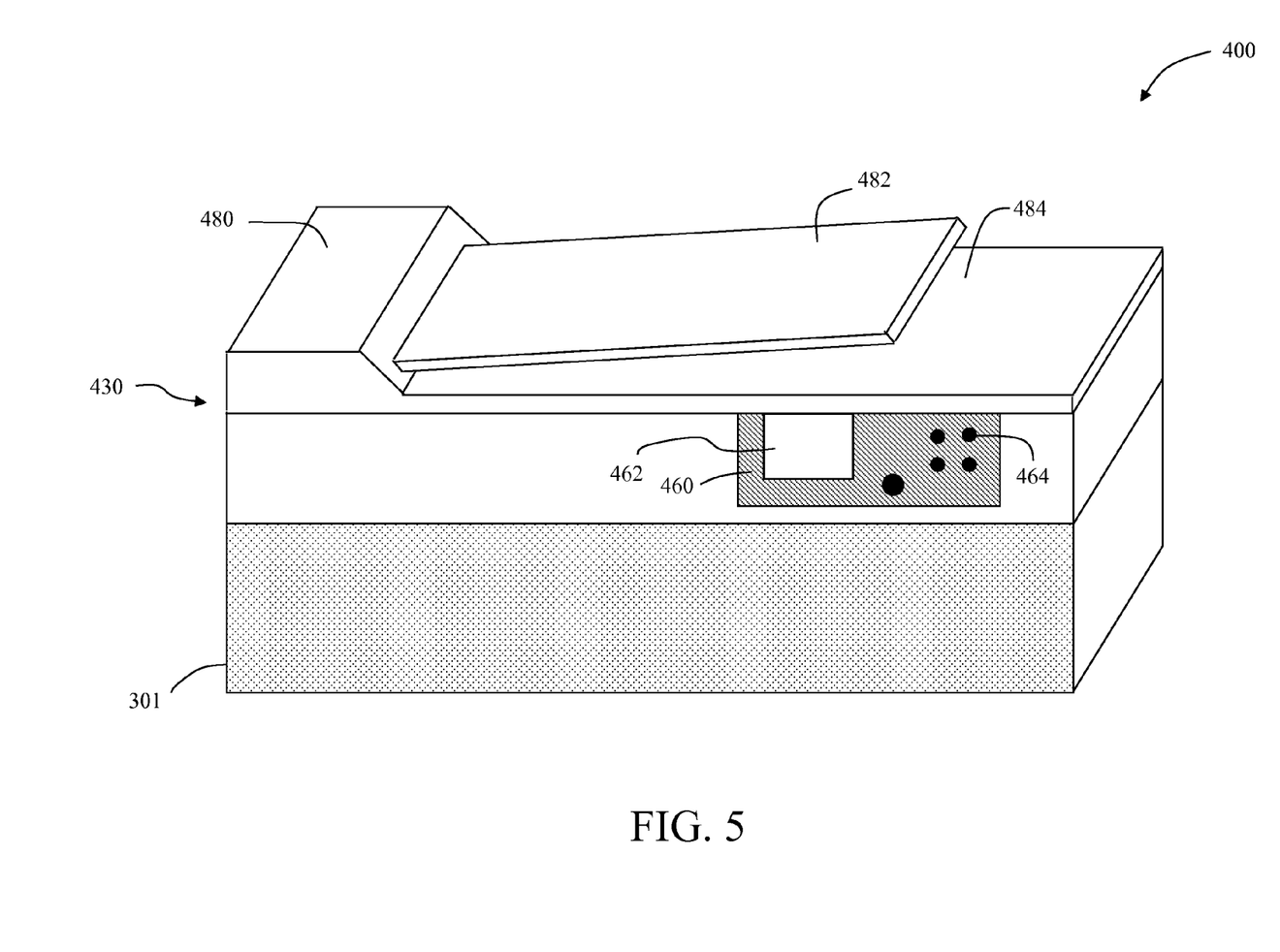
FIG. 5 is a perspective of a multifunction printer.

FIG. 5 shows a perspective of a multifunction printer 400 including a scanning apparatus 430, an ADF 480, and a printing apparatus 301, such as an inkjet printer. Multifunction printer 400 can do printing, scanning of documents, or copying of documents (i.e. printing plus scanning) ADF 480 includes an input tray 482 where documents for scanning or copying are stacked, and an output tray 484 for receiving scanned documents. A control panel 460 includes a display 462 and a variety of control buttons 464 with which the user can provide a variety of instructions.

Figure 6:
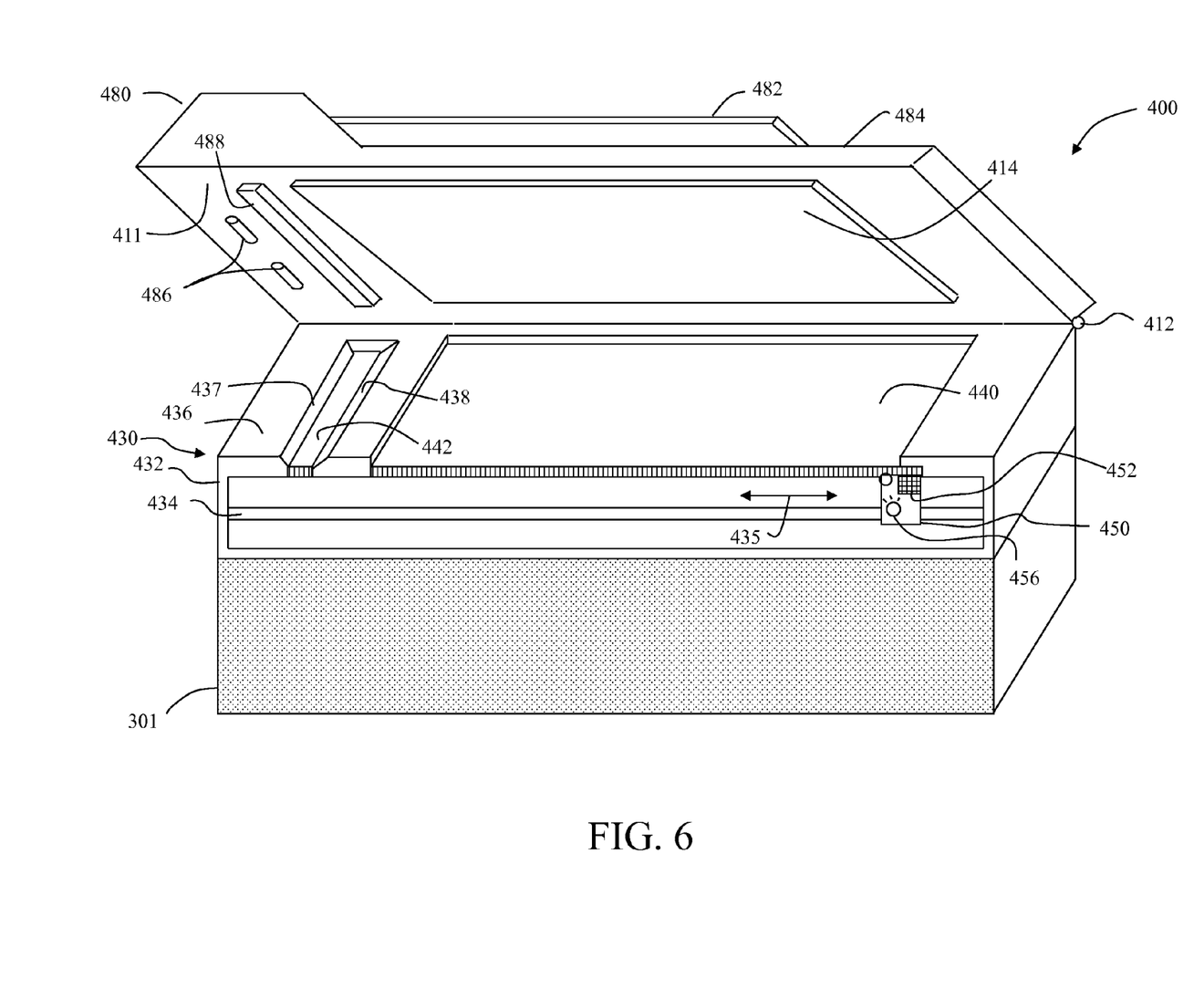
FIG. 6 is a cutaway view of the multifunction printer of FIG. 5 with the automatic document feeder raised.

As shown in the cutaway view of FIG. 6 (similar to FIG. 5 but with the ADF 480 raised up), the ADF 480 can be attached to a scanning apparatus body 432 of the scanning apparatus 430 by a hinge 412, so that an under side 411 of ADF 480 can function as a lid for the scanning apparatus 430. The surface of the scanning apparatus body 432 that is covered by the under side 411 of the ADF 480 when the ADF 480 is closed includes a frame 436. A transparent platen 440 (typically a flat piece of glass) is inset within the frame 436. The front of the scanning apparatus 430 is cut away in FIG. 6 in order to show a movable scan assembly 450 below the transparent platen 440. The scan assembly 450 includes a photosensor array 452 (such as a contact image sensor) extending the width of the transparent platen 440, and a light source 456 that illuminates a scan line of a document or other item (not shown) that is placed on top of the transparent platen 440. A light guide and other optics (not shown) can also be included in the scan assembly 450. The scan assembly 450 is moved back and forth along a scanning guide 434 in a scanning direction 435 across the length of the transparent platen 440 in order to scan the document or other item, receiving reflected light from the item through the transparent platen 440 scan line by scan line and converting the reflected light into electrical signals. The controller 14 (see FIG. 1), at least of portion of which can be included in the system on chip, converts the electrical signals into digitized data to form a digitized image of the item. The scanning guide 434 can be a round rail, a rack and pinion or other guiding member that can use the power of a scan motor 470 (see FIG. 9) to provide a linear motion along the scanning direction 435. A pressing plate 414 is affixed to the under side 411. The pressing plate 414 can be compressible or it can be resiliently mounted so that an item to be manually scanned is pressed against the transparent platen 445. A separate ADF transparent platen 442 is provided for scanning documents being fed by the ADF 480. The document to be scanned is moved by a transporter such as rollers 486 down a down ramp 437, across the ADF transparent platen 442, up an up ramp 438 and toward the under side 411 through which it passes on its way to the output tray 484. A pressing member 488 forces the document into contact with the ADF transparent platen 442 for scanning by the scan assembly 450, which is parked below the ADF transparent platen 442 during ADF scanning. Some automatic document feeders have duplexing capability for scanning both sides of a two-sided original. For scanning only a first side of the document the ADF feeds the document along the usual path and a set of duplexing rollers (not shown) rotates in forward direction to move the scanned document toward the output tray 484. To also scan the second side, after the document has moved toward the output tray 484, the duplexing rollers (not shown) are rotated in reverse to move the document along a duplex document path (not shown) and from there to rollers 486 to move the second side across the ADF transparent platen 482.

Not shown in FIGS. 5 and 6 are a scan motor 470 for moving scan assembly 450 during manual scanning or an ADF motor 472 (see FIG. 9) for feeding documents through the ADF 480. It can be appreciated that the scan motor 470 needs to operate in both forward and reverse directions to move the scan assembly 450 across the document for scanning, and then return to its home position. In addition, for duplexing automatic document feeders, the ADF motor 472 also needs to operate in forward direction for moving the document toward the output tray, and in reverse direction for duplexing in order to scan the second side of the document.

Figure 7A:
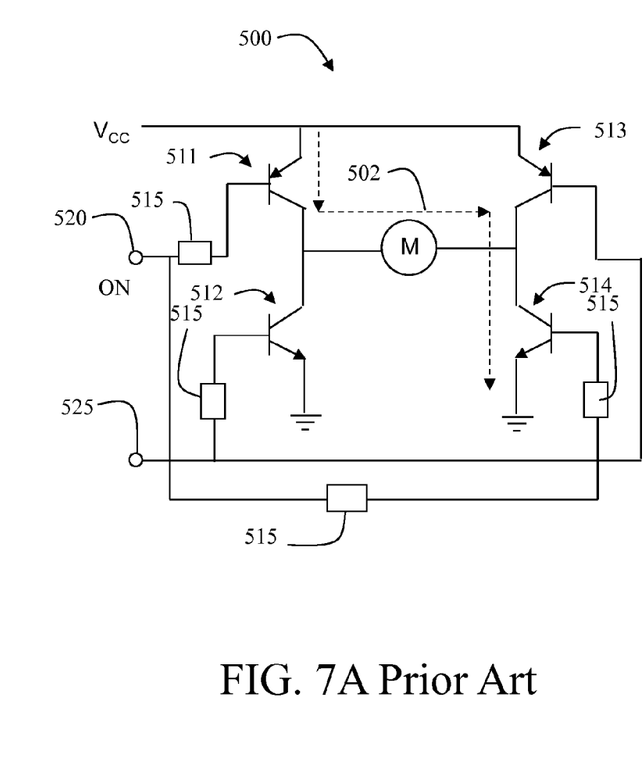
FIGS. 7A and 7B show a prior art transistor bridge circuit for powering a motor in forward direction and reverse direction respectively.
Figure 7B:
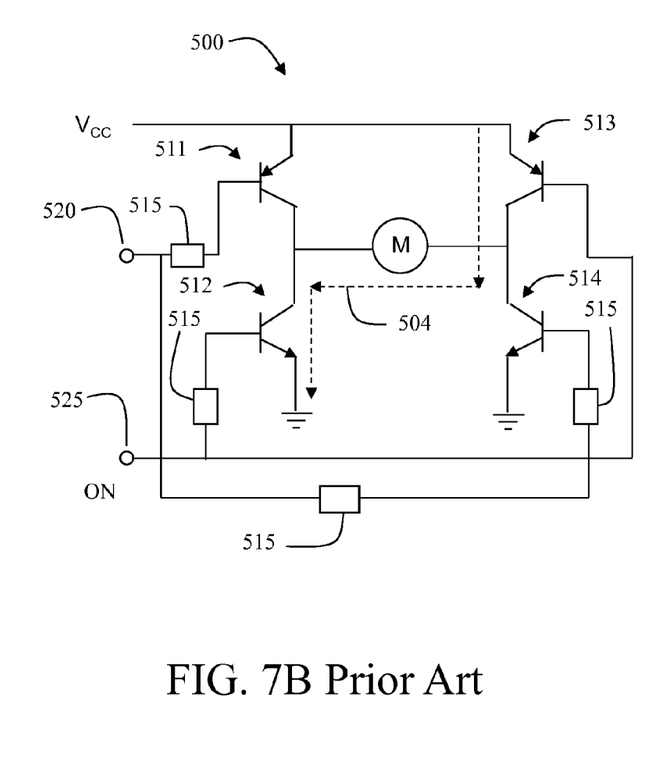

FIGS. 7A and 7B show a prior art transistor bridge circuit 500 that is conventionally used for operating a motor M in a forward direction (FIG. 7A) and in a reverse direction (FIG. 7B). Motor direction is determined by the direction of current passing through motor M (indicated by a dashed line current path 502 in FIG. 7A and by a dashed line current path 504 in FIG. 7B). In the example of FIGS. 7A and 7B the transistor bridge circuit 500 uses four bipolar junction transistors 511, 512, 513, and 514, but MOSFETS could alternatively be used. As shown, the collectors of PNP transistors 511 and 513 are connected to voltage source $V_{CC}$, and the emitters of NPN transistors 512 and 514 are connected to ground. The bases of the transistors 511 and 514 are connected via base driver circuits 515 to a control terminal 520, and the bases of the transistors 512 and 512 are connected via base driver circuits 515 to the control terminal 525. When an on pulse is applied by the control terminal 520 (as in FIG. 7A), the transistors 511 and 514 turn on and current goes along the dashed line current path 502, so that motor M moves in its forward direction. When an on pulse is applied by the control terminal 525 (as in FIG. 7B), transistors 512 and 513 turn on and the current goes along the dashed line current path 504, so that motor M moves in its reverse direction. To move the motor faster or slower, pulse width modulation is used to control the width and duty cycle of the on pulses applied to control terminal 520 or 525. Two bridge circuits 500 are required for a conventional scanning apparatus—one for the scan motor 470 and one for the ADF motor 472.

Figure 8A:
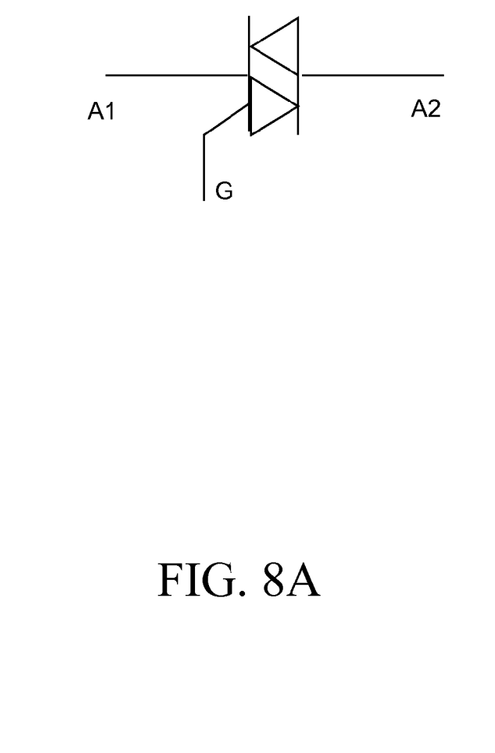
FIG. 8A shows a TRIAC.
Figure 8B:
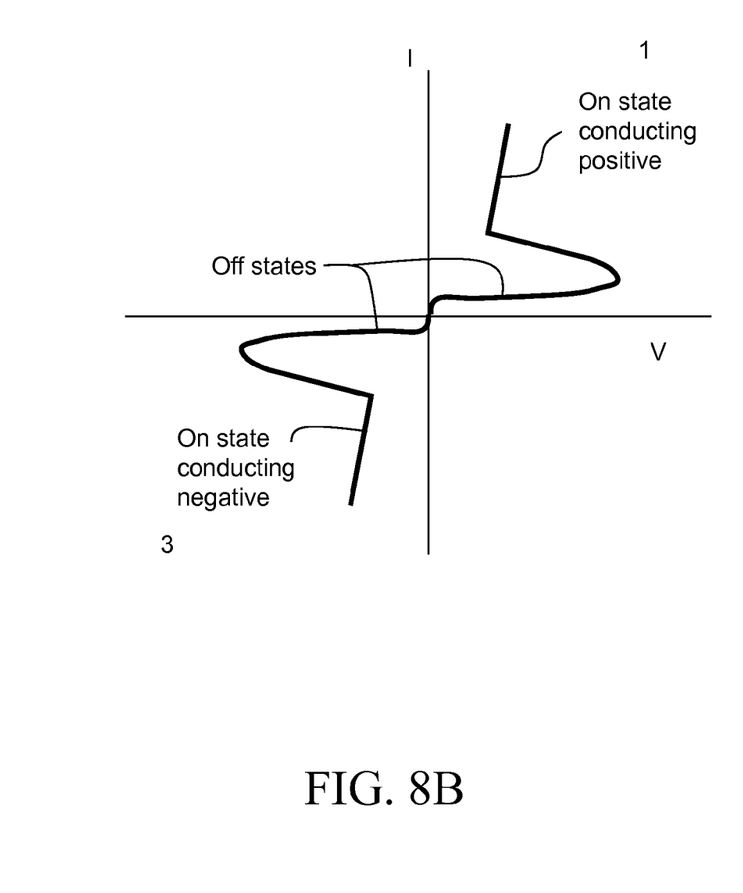
FIG. 8B shows a voltage-current characteristic for a TRIAC.

FIG. 8A shows a TRIAC, which is a type of bi-directional semiconductor switch element used in an embodiment of the invention as described below. TRIACs are closely related to silicon-controlled rectifiers (SCR). However, unlike SCRs which conduct current only in one direction, TRIACs are bi-directional, so that current can flow through them in either direction. A TRIAC can be triggered by either a positive or a negative current applied to its gate electrode G. In order to create a triggering current, a positive or negative voltage is applied to gate G with respect to the A1 main terminal. Once triggered, the device continues to conduct until the current drops below a threshold called the holding current. FIG. 8B is a voltage-current characteristic of a TRIAC. In quadrant 1 of FIG. 8B, gate G and main terminal A2 are positive with respect to main terminal A1. Current flows from A2 to A1. In quadrant 3, gate G and main terminal A2 are negative with respect to main terminal A1. Current flows from A1 to A2. Current flows from the first main terminal A1 to the second main terminal A2 or from the second main terminal A2 to the first main terminal A1 is enabled when a voltage greater in magnitude than a predetermined threshold voltage is applied to gate G.

Figure 9:
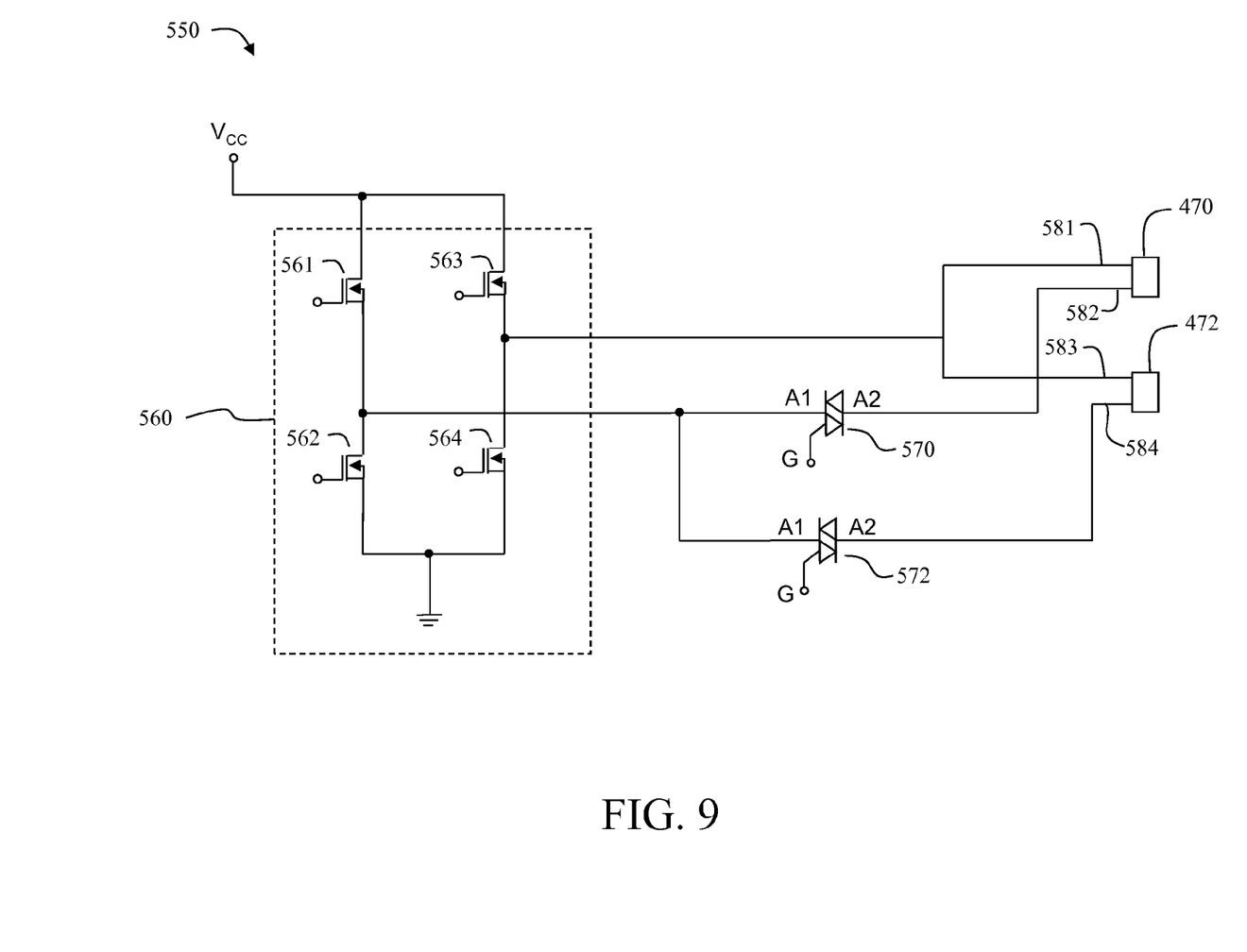
FIG. 9 shows a circuit diagram for a motor control circuit according to an embodiment of the invention.

FIG. 9 shows a motor control circuit 550 for selectively controlling forward and reverse current to the scan motor 470 and the ADF motor 472 using one motor driver 560 and two bi-directional switch elements, such as first TRIAC 570 and second TRIAC 572 according to an embodiment of the invention. The motor driver 560 includes four MOSFET transistors 561, 562, 563 and 564 in this example. The drains of the transistors 561 and 563 are connected to voltage $V_{CC}$. The sources of the transistors 562 and 564 are connected to ground. The source of the transistor 563 and the drain of transistor 564 are connected to a first motor terminal 581 of the scan motor 470 and to a first motor terminal 583 of the ADF motor 472. The source of the transistor 561 and the drain of the transistor 562 are connected to first main terminal A1 of TRIAC 570 and to first main terminal A1 of TRIAC 572. Second main terminal A2 of TRIAC 570 is connected to a second motor terminal 582 of scan motor 470. Second main terminal A2 of TRIAC 572 is connected to a second motor terminal 584 of the scan motor 472.

When motor driver 560 causes gate G and main terminal A2 to be positive with respect to main terminal A1 of TRIAC 570, current flows from A2 to A1, i.e. from the first motor terminal 581 to the second motor terminal 582 of the scan motor 470 causing the scan motor 470 (and thereby the scan assembly 450) to move in a forward direction. When motor driver 560 causes gate G and main terminal A2 to be negative with respect to main terminal A1 of TRIAC 570, current flows from A1 to A2, i.e. from the second motor terminal 582 to the first motor terminal 581 of scan motor 470 causing scan motor 470 (and thereby scan assembly 450) to move in a reverse direction.

Alternatively, when the motor driver 560 causes gate G and main terminal A2 to be positive with respect to main terminal A1 of TRIAC 572, current flows from A2 to A1, i.e. from the first motor terminal 583 to the second motor terminal 584 of the ADF motor 472 causing the ADF motor 472 (and thereby the duplexing rollers) to move in a forward direction. When the motor driver 560 causes gate G and main terminal A2 to be negative with respect to main terminal A1 of TRIAC 572, current flows from A1 to A2, i.e. from the second motor terminal 584 to the first motor terminal 583 of the ADF motor 472 causing the ADF motor 472 (and thereby the duplexing rollers) to move in a reverse direction.

In this way, the scan motor 470 or the ADF motor 472 can selectively be driven in forward or reverse directions. The motor driver 560 is shared between the scan motor 470 and the ADF motor 472, thus saving one motor driver as compared to a conventional scanning apparatus having a duplexing ADF. For the same current rating, two TRIACs are significantly cheaper than a motor driver. For a 300 mA motor driver appropriate for driving the scan motor 470 and the ADF motor 472 the net savings is approximately 30 cents. TRIAC 570 and TRIAC 572 can be provided as discrete components that are separate from the motor driver 560 or integrated within the motor driver 560. For instances where TRIAC 570 and TRIAC 572 are separate from the motor driver 560, TRIAC 570 and TRIAC 572 can be integrated together into a single semiconductor circuit device.

As described above relative to the prior art transistor bridge circuit 500 of FIGS. 7A and 7B, in a similar way current pulses and pulse width modulation can be used in circuit 550 (FIG. 9) according to an embodiment of the invention to control the speed of the scan motor 470 or the ADF motor 472. In particular, the motor driver 560 is configured to selectively provide positive or negative pulses to the main terminals A1 and A2 of TRIAC 570 or TRIAC 572.

The invention has been described in detail with particular reference to certain preferred embodiments thereof, but it will be understood that variations and modifications can be effected within the spirit and scope of the invention.

PARTS LIST

| | |
|---|---|
| 10 | Inkjet printer system |
| 12 | Image data source |
| 14 | Controller |
| 15 | Image processing unit |
| 16 | Electrical pulse source |
| 18 | First fluid source |
| 19 | Second fluid source |
| 20 | Recording medium |
| 100 | Inkjet printhead |
| 110 | Inkjet printhead die |
| 111 | Substrate |
| 120 | First nozzle array |
| 121 | Nozzle(s) |
| 122 | Ink delivery pathway (for first nozzle array) |
| 130 | Second nozzle array |
| 131 | Nozzle(s) |
| 132 | Ink delivery pathway (for second nozzle array) |
| 181 | Droplet(s) (ejected from first nozzle array) |
| 182 | Droplet(s) (ejected from second nozzle array) |
| 200 | Carriage |
| 250 | Printhead |
| 251 | Printhead die |
| 253 | Nozzle array |
| 254 | Nozzle array direction |
| 256 | Encapsulant |

-continued

PARTS LIST

| | |
|---|---|
| 257 | Flex circuit |
| 258 | Connector board |
| 262 | Multi-chamber ink supply |
| 264 | Single-chamber ink supply |
| 300 | Printer chassis |
| 301 | Printing apparatus |
| 302 | Paper load entry direction |
| 303 | Print region |
| 304 | Media advance direction |
| 305 | Carriage scan direction |
| 306 | Right side of printer chassis |
| 307 | Left side of printer chassis |
| 308 | Front of printer chassis |
| 309 | Rear of printer chassis |
| 310 | Hole (for paper advance motor drive gear) |
| 311 | Feed roller gear |
| 312 | Feed roller |
| 313 | Forward rotation direction (of feed roller) |
| 320 | Pick-up roller |
| 322 | Turn roller |
| 323 | Idler roller |
| 324 | Discharge roller |
| 325 | Star wheel(s) |
| 330 | Maintenance station |
| 370 | Stack of media |
| 371 | Top piece of medium |
| 380 | Carriage motor |
| 382 | Carriage guide rail |
| 383 | Encoder fence |
| 384 | Belt |
| 390 | Printer electronics board |
| 392 | Cable connectors |
| 400 | Multifunction printer |
| 411 | Under side of automatic document feeder |
| 412 | Hinge |
| 414 | Pressing plate |
| 430 | Scanning apparatus |
| 432 | Scanning apparatus body |
| 434 | Scanning guide |
| 435 | Scanning direction |
| 436 | Frame |
| 437 | Down ramp |
| 438 | Up ramp |
| 440 | Transparent platen |
| 442 | ADF transparent platen |
| 450 | Scan assembly |
| 452 | Photosensor array |
| 456 | Light source |
| 460 | Control panel |
| 462 | Display |
| 464 | Control buttons |
| 470 | Scan motor |
| 472 | ADF motor |
| 480 | Automatic document feeder |
| 482 | Input tray |
| 484 | Output tray |
| 486 | Document feed rollers |
| 488 | Pressing member |
| 500 | Transistor bridge circuit (prior art) |
| 502 | Current path (forward) |
| 504 | Current path (reverse) |
| 511-514 | Transistors (of transistor bridge circuit) |
| 515 | Base driver circuits |
| 520 | Control terminal |
| 525 | Control terminal |
| 550 | Motor control circuit |
| 560 | Motor driver |
| 561-564 | Transistors (in motor driver) |
| 570 | TRIAC (for scan motor control) |
| 572 | TRIAC (for ADF motor control) |
| 581-582 | Motor terminals (for scan motor) |
| 583-584 | Motor terminals (for ADF motor) |

The invention claimed is:
1. A scanning apparatus comprising:
a transparent platen;
a scan assembly;

a first motor for moving the scan assembly across the transparent platen;

an automatic document feeder;

a second motor for feeding documents through the automatic document feeder;

a first bi-directional switch element for driving the first motor;

a second bi-directional switch element for driving the second motor; and a motor driver for selectively controlling the first bi-directional switch element or the second bi-directional switch element.

2. The scanning apparatus of claim 1, wherein the first motor is configured to move the scan assembly in a first direction when current flows through the first bi-directional switch element in a first direction, and to move the scan assembly in a second direction when current flows through the first bi-directional switch element in a second direction.

3. The scanning apparatus of claim 1, the automatic document feeder including a roller, wherein the second motor is configured to rotate the roller in a first direction when current flows through the second bi-directional switch element in a first direction, and to rotate the roller in a second direction when current flows through the second bi-directional switch element in a second direction.

4. The scanning apparatus of claim 3, wherein the automatic document feeder includes a duplex document path.

5. The scanning apparatus of claim 1, wherein the first bi-directional switch element and the second bi-directional switch element are provided as discrete components that are separate from the motor driver.

6. The scanning apparatus of claim 1, wherein the first bi-directional switch element and the second bi-directional switch element are integrated into a single device.

7. The scanning apparatus of claim 1, wherein the first bi-directional switch element and the second bi-directional switch element are TRIACs.

8. The scanning apparatus of claim 7, each TRIAC including a gate wherein the motor driver is configured to provide a positive voltage or a negative voltage to the gate of the first TRIAC or the gate of the second TRIAC.

9. The scanning apparatus of claim 8, each TRIAC further including a first main terminal and a second main terminal, wherein current flow from the first main terminal to the second main terminal or from the second main terminal to the first main terminal is enabled when a voltage is applied to the gate, the voltage being greater in magnitude than a predetermined threshold voltage.

10. The scanning apparatus of claim 9, wherein the motor driver is configured to provide positive or negative pulses to the main terminals of the first TRIAC or the second TRIAC.

11. The scanning apparatus of claim 1, wherein the motor driver is configured to control the speed of the first motor or the second motor using pulse width modulation.

12. A multifunction printer comprising:

a printing apparatus including:

a printhead;

a carriage for moving the printhead across a print region; and a media advance system for moving media into the print region; and a scanning apparatus including:

a transparent platen;

a scan assembly;

a first motor for moving the scan assembly across the transparent platen;

an automatic document feeder;

a second motor for feeding documents through the automatic document feeder;

a first bi-directional switch element for driving the first motor;

a second bi-directional switch element for driving the second motor; and a motor driver for selectively controlling the first bi-directional switch element or the second bi-directional switch element.

13. The multifunction printer of claim 12, wherein the first motor is configured to move the scan assembly in a first direction when current flows through the first bi-directional switch element in a first direction, and to move the scan assembly in a second direction when current flows through the first bi-directional switch element in a second direction.

14. The multifunction printer of claim 12, the automatic document feeder including a roller, wherein the second motor is configured to rotate the roller in a first direction when current flows through the second bi-directional switch element in a first direction, and to rotate the roller in a second direction when current flows through the second bi-directional switch element in a second direction.

15. The multifunction printer of claim 14, wherein the automatic document feeder includes a duplex document path.

16. The multifunction printer of claim 12, wherein the first bi-directional switch element and the second bi-directional switch element are provided as discrete components that are separate from the motor driver.

17. The multifunction printer of claim 12, wherein the first bi-directional switch element and the second bi-directional switch element are integrated into a single device.

18. The multifunction printer of claim 12, wherein the first bi-directional switch element and the second bi-directional switch element are TRIACs.

19. The multifunction printer of claim 18, each TRIAC including a gate wherein the motor driver is configured to provide a positive voltage or a negative voltage to the gate of the first TRIAC or the gate of the second TRIAC.

20. The multifunction printer of claim 19, each TRIAC further including a first main terminal and a second main terminal, wherein current flow from the first main terminal to the second main terminal or from the second main terminal to the first main terminal is enabled when a voltage is applied to the gate, the voltage being greater in magnitude than a predetermined threshold voltage.

21. The multifunction printer of claim 20, wherein the motor driver is configured to provide positive or negative pulses to the main terminals of the first TRIAC or the second TRIAC.

22. The multifunction printer of claim 12, wherein the motor driver is configured to control the speed of the first motor or the second motor using pulse width modulation.

* * * * *